US008844376B2

(12) United States Patent
Siklos et al.

(10) Patent No.: US 8,844,376 B2
(45) Date of Patent: Sep. 30, 2014

(54) MULTI-DEGREE OF FREEDOM TRANSDUCER

(71) Applicant: General Electric Company, Schenectady, NY (US)

(72) Inventors: Norbert Siklos, Budaors (HU); Balint Czupi, Budaors (HU); Norbert Krizsan, Budaors (HU); Zsofia Beky, Budaors (HU)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 13/623,062

(22) Filed: Sep. 19, 2012

(65) Prior Publication Data

US 2013/0068037 A1 Mar. 21, 2013

(30) Foreign Application Priority Data

Sep. 20, 2011 (EP) .................................. 11462014

(51) Int. Cl.
*G01L 1/22* (2006.01)
*G01D 7/00* (2006.01)
*G01L 5/22* (2006.01)
*G01L 5/16* (2006.01)

(52) U.S. Cl.
CPC ............... *G01L 1/2225* (2013.01); *G01L 5/223* (2013.01); *G01L 5/161* (2013.01)
USPC ............ 73/862.044; 73/862.043; 73/862.042; 73/862.045

(58) Field of Classification Search
CPC ........ G01L 5/161; G01L 5/2243; G01L 5/226
USPC ...................... 73/862.041–862.046
See application file for complete search history.

(56) References Cited

U.S. PATENT DOCUMENTS

| 4,369,663 A | 1/1983 | Venturello et al. |
| 4,448,083 A * | 5/1984 | Hayashi .................. 73/862.042 |

(Continued)

FOREIGN PATENT DOCUMENTS

| WO | 86/01597 A1 | 3/1986 |
| WO | 2006/134089 A1 | 12/2006 |
| WO | 2008/023846 A2 | 2/2008 |

OTHER PUBLICATIONS

EP Search Report from corresponding EP Patent Application 11462014.9 Date as Mar. 6, 2012.

*Primary Examiner* — Max Noori
*Assistant Examiner* — Jonathan Dunlap
(74) *Attorney, Agent, or Firm* — Global Patent Operation; Marc A. Vivenzio (57) ABSTRACT

A multi-degree of freedom transducer for converting manually applied forces and torques into electrical signals, and configured to be fixed to a base object. The transducer comprises a handle bar having two ends and a first longitudinal direction, and a supporting assembly suitable for fixing the two ends of the handle bar to the base object. The supporting assembly comprising a frame structure at each of the ends of the handle bar, wherein each of the frame structures comprises at least two measuring beams. At least one of the measuring beams includes a second longitudinal direction and at least one other of the measuring beams includes a third longitudinal direction. Each of the at least two measuring beams comprises two strain gauges configured to sense strain in the third longitudinal direction and arranged on two different, non-parallel side surfaces of each of the at least two measuring beams.

6 Claims, 6 Drawing Sheets

(56) References Cited

U.S. PATENT DOCUMENTS

| | | | |
|---|---|---|---|
| 4,573,362 A * | 3/1986 | Amlani | 73/862.045 |
| 4,587,471 A | 5/1986 | Barthelmes et al. | |
| 4,640,138 A | 2/1987 | Meyer et al. | |
| 5,648,617 A * | 7/1997 | Cullen et al. | 73/862.045 |
| 5,969,268 A * | 10/1999 | Sommerfeld et al. | 73/862.041 |
| 6,038,933 A * | 3/2000 | Meyer | 73/862.045 |
| 6,459,092 B2 | 10/2002 | Cho et al. | |
| 6,575,031 B2 * | 6/2003 | Haeg et al. | 73/503 |

\* cited by examiner

MULTI-DEGREE OF FREEDOM TRANSDUCER

BACKGROUND OF THE INVENTION

The subject matter disclosed herein relates to a multi-degree of freedom transducer for converting manually applied forces and/or torques into electrical signals, and more particularly, to a six degrees of freedom transducer for a medical tableside user interface enabling motion-control of mechanical and/or virtual components.

In medical applications it is often necessary to position a patient with respect to an external x-ray or radiotherapy beam. In the field of radiotherapy and X-ray imaging the irradiation of beams requires very high precision, it is therefore of prime importance to position the patient correctly with respect to the radiation. In radiotherapy and X-ray imaging, the patient is generally placed on a table and then the table and/or the X-ray device is positioned using electromechanical equipment.

In recent years, there have been proposed joystick-like or button-based manipulators to perform mechanical positioning in medical applications. In such proposed systems, one of the common problems is that a number of joysticks or buttons are necessary to enable six degrees of freedom positioning, making the positioning difficult. An operator has to observe the motions of the controlled object, i.e. a visual feedback is necessary which is highly disadvantageous in medical applications where often quick actions are necessary.

Furthermore, the joystick-like controllers involve complex moving parts, difficult replacement of the transducer elements, and some systems do not provide six degrees of freedom sensing. A further requirement for such controllers is that they should enable their manipulation also if covered with a replaceable aseptic foil for a longer period without the risk of damaging the foil. This is not really possible with moveable controllers, e.g. joysticks. Space saving is also essential around the table to allow the doctors to do their job. In some medical applications, the operations are to be carried out in a dark environment, especially when surgical actions are followed on screens. The known controllers do not allow their use in such situations, as they can not be properly actuated if they are not or are hardly visually locatable.

U.S. Pat. No. 6,459,092 B2 discloses a six degrees of freedom motion measuring apparatus using a multidirectional reflector and a swing arm type optical system. This optical measurement is not suitable for the above intended purposes.

U.S. Pat. No. 4,369,663 discloses a six degrees of freedom transducer for a manipulator. The transducer contains moving parts and is based on capacitive displacement measurement. Moving, parts have the drawbacks above and are more sensitive to dust and contamination.

Thus, there is a need for a solution allowing an improvement over existing methods and devices. There is a need to provide a multi-degree of freedom transducer, especially for medical purposes, which eliminates the drawbacks and deficiencies of the prior art techniques. There is a particular need for a transducer having a relatively small size, not containing moving parts and enabling its application in sterile and dark workplaces. There is also a need for a transducer that enables that the controlled object moves according to a wrist motion of an operator through strain measurement.

BRIEF DESCRIPTION OF THE INVENTION

According to an embodiment of the invention, a multi-degree of freedom transducer is provided. The transducer can be used for converting manually applied forces and torques into electrical signals, and can be fixed to a base object. The transducer comprises a handle bar having two ends and a first longitudinal direction, and a supporting assembly suitable for fixing the two ends of the handle bar to the base object. The supporting assembly comprising a frame structure at each of the ends of the handle bar, wherein each of the frame structures comprises at least two measuring beams, at least one of the measuring beams having a second longitudinal direction and at least one other of the measuring beams having a third longitudinal direction, wherein the first, second and third longitudinal directions are different from each other. Each of the at least two measuring, beams comprises two strain gauges configured to sense strain in the third longitudinal direction; the strain gauges are arranged on two different, non-parallel side surfaces of each of the at least two measuring beams.

The proposed transducer can be used in medical applications. The proposed transducer geometry enables effective wrist motion sensing without moving parts. The controlled object moves according to the wrist motion of an operator through strain measurement, thereby less attention and time is necessary for the manipulation.

BRIEF DESCRIPTION OF THE DRAWINGS

Characteristics, objectives and advantages of embodiments of the subject matter will become apparent from the following description, which is given solely by way of illustration and is non-limiting, and is to be read with reference to the appended drawings in which.

DETAILED DESCRIPTION OF EXEMPLARY EMBODIMENTS OF THE INVENTION

Figure 1:
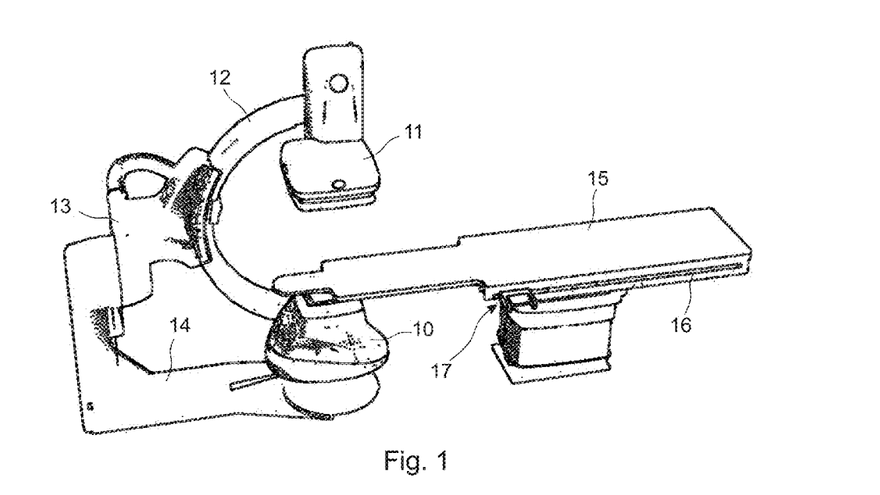
FIG. 1 illustrates a schematic view of an X-ray apparatus for which the transducer can be used.

Referring first to FIG. 1, an X-ray apparatus is schematically shown for which the transducer can be used. The X-ray apparatus comprises an X-ray emitter 10 and a detector 11 which are connected with each other by a C-arm 12. The C-arm 12 is mounted onto a pivot 13; the C-arm 12 can be moved along its arc by means of an electromechanical drive in the pivot 13. The pivot 13 is rotatably mounted onto an end of an L-arm 14; the pivot 13 can be rotated around a horizontal axis by means of another electromechanical drive. The other end of the L-arm 14 is fixed in a rotatable way and is rotatable around a vertical axis by means of a further electromechanical drive. All the above mentioned parts are called together as a gantry. The structure of the gantry enables adjustment of the direction of the X-ray beam b means of moving together the X-ray emitter 10 and the detector 11 in six degrees of freedom.

The X-ray apparatus also comprises a table 15 which is also movable and rotatable in six degrees of freedom. The table has a rail 16 along one of its longitudinal sides and a transducer 17 is attached to the rail 16. In the depicted embodiment, a table 15 serves as a base object, to which the transducer 17 is fixed. Transducer 17 is a multi-degree of freedom transducer 17 for converting manually applied forces and torques into electrical signals.

Figure 2:
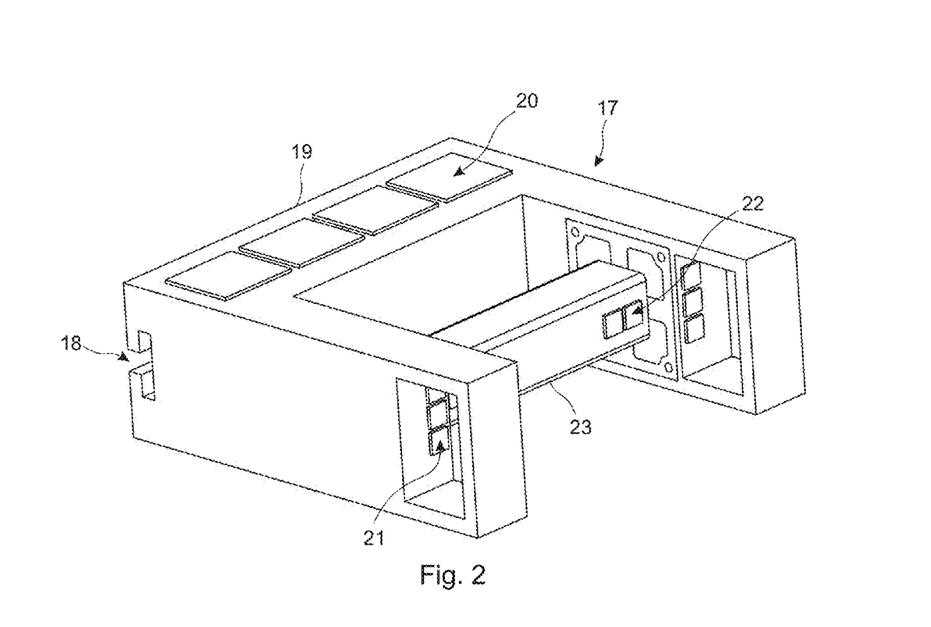
FIG. 2 shows a schematic view of a transducer in accordance with the subject matter described herein.

A schematic view of an embodiment of the transducer is shown in FIG. 2. The transducer comprises a supporting assembly 19 having a housing. The housing can be attached by means of a groove 18 to the rail 16, and can comprise a number of function buttons.

Function buttons 20 can serve for operating various medical devices, such as catheters or collimators. Function buttons 21 can serve for selecting between controlling the gantry, the table 15 or a virtual 3D object on a screen. These main function buttons 21 can be positioned to the thumb, so there is no need to lift the hand from the device for pushing. Function buttons 22 can serve for enabling manipulation and for adjusting manipulation sensitivity. The finger-positioned enable button eliminates the risk of accidental actuating. Function buttons 21 and 22 can be duplicated and can be present on both sides of the housing, enabling an ergonomic use for both fight and left handed users. The function buttons 20, 21 and 22 can be equipped with capacitive sensors, so when a user hovers over a button, a feedback signal is given to the user in visual and/or audio format to provide information on the particular button or action.

Figure 3:
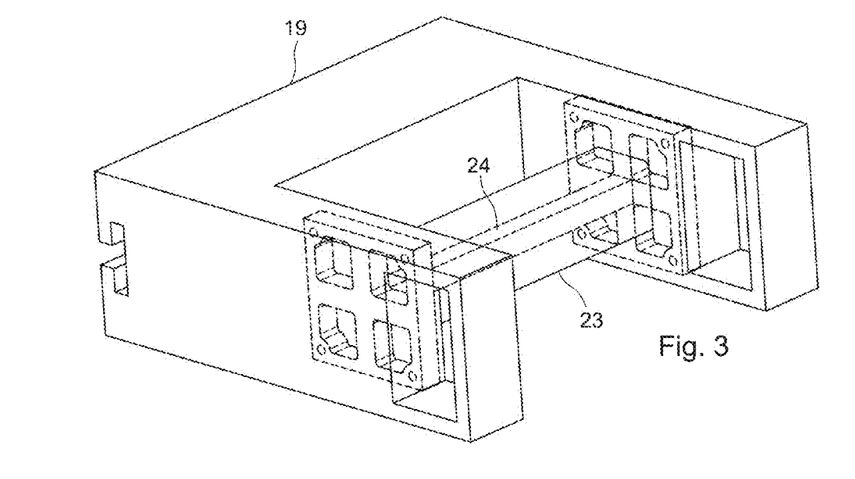
FIG. 3 illustrates a schematic view of the transducer of FIG. 2 showing a sensing unit therein.

The transducer 17 can also have a grip element 23 to be gripped by the operator. As shown in FIG. 3, the grip element 23 is fixed to and is arranged around a handle bar 24 of a sensing unit of the transducer.

Figure 4:
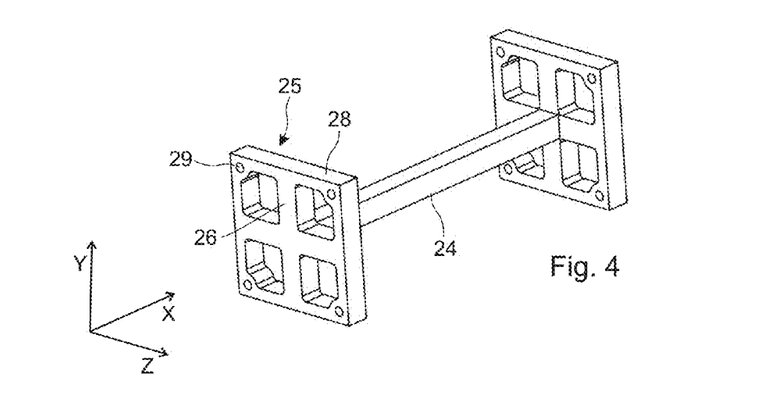
FIG. 4 shows a schematic view of the structure of the sensing unit of FIG. 3.

FIG. 4 shows a schematic view of the structure of the sensing unit of FIG. 3, wherein strain gauges are not depicted. The sensing unit comprises the handle bar 24 which has two ends. The two ends define a longitudinal direction of the handle bar 24 called as a first direction X. The supporting assembly 19 serves for fixing the two ends of the handle bar 24 to the base object, i.e. to table 15 in the depicted embodiment. For this purpose, the supporting assembly 19 comprises a frame structure 25 at each of the ends of the handle bar 24.

Each of the frame structures 25 comprises at least two measuring beams 26, in the depicted embodiment four measuring beams 26. Two of the measuring beams 26 have a same longitudinal direction being a second direction Y and the other two have a same longitudinal direction being a third direction Z. The first, second and third directions X, Y, Z are different from each other, preferably they are orthogonal directions. The three different directions of the structure enable the sensing of forces and torques by suitably arranged sensors in six degrees of freedom.

Each of the frame structures 25 can further comprise a frame member 28 around the respective end of the handle bar 24. The measuring beams 26 can be arranged in a spoke-like manner and can interconnect the end of the handle bar 24 with the frame member 28. The frame members 28 can be fixed by means of bores 29 to the remaining part of the supporting structure 19.

Figure 5:
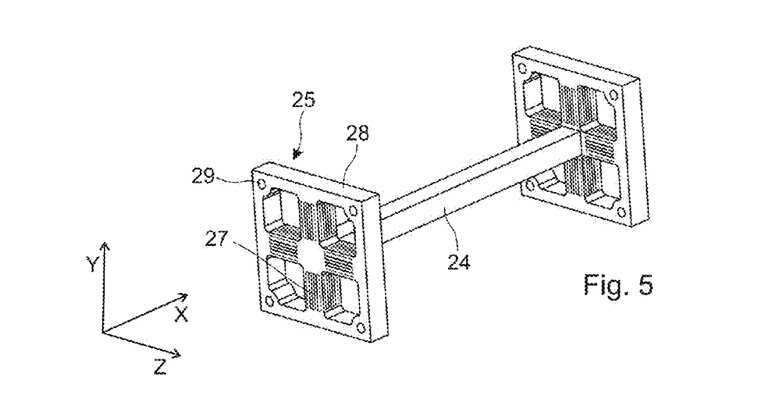
FIG. 5 illustrates a schematic view of the sensing unit of FIG. 3 also depicting attached strain gauges.
Figures 6, 7:
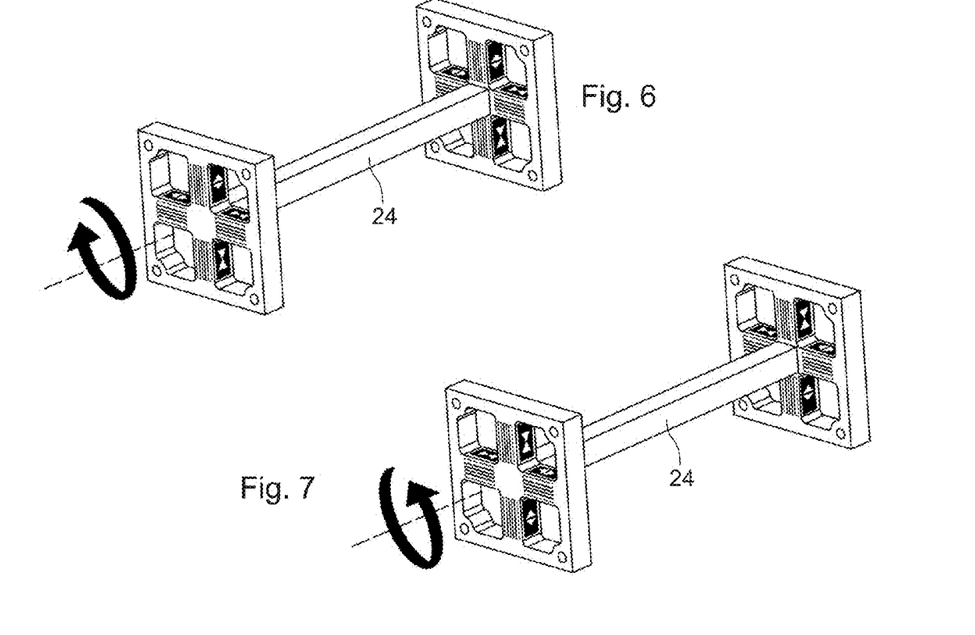
FIGS. 6 to 17 show schematic views of the sensing unit of FIG. 3, in which strain gauge responses according to applied forces and torques are depicted.
Figures 8, 9:
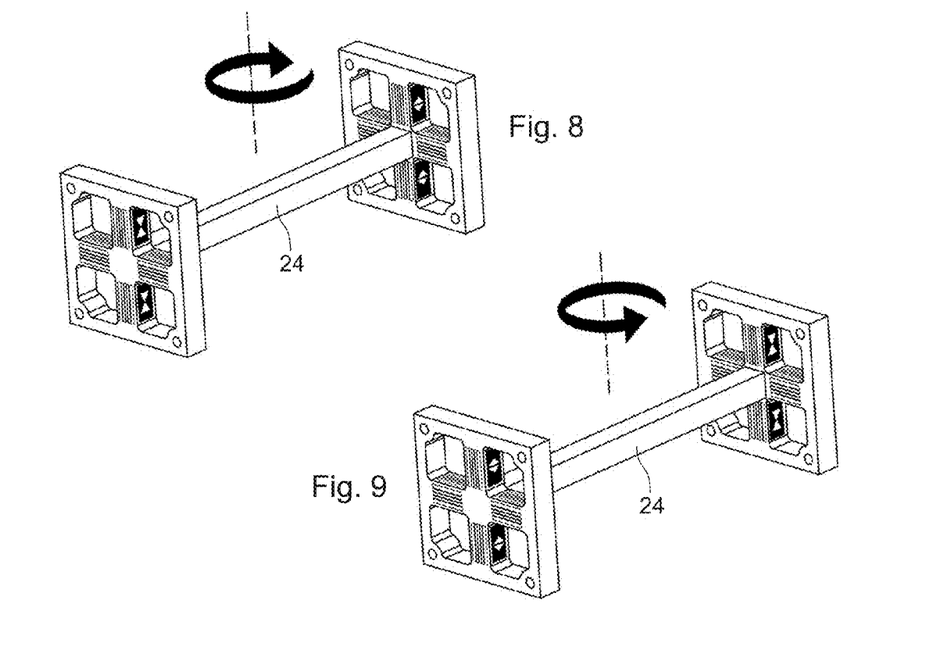
Figure 10:
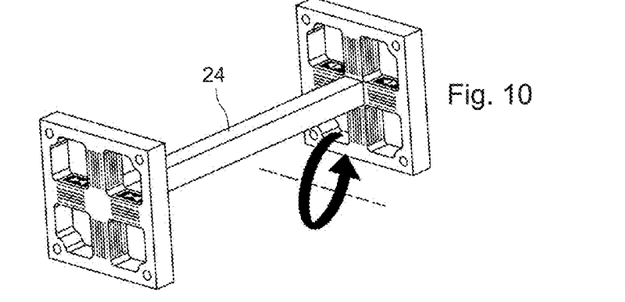
Figure 11:
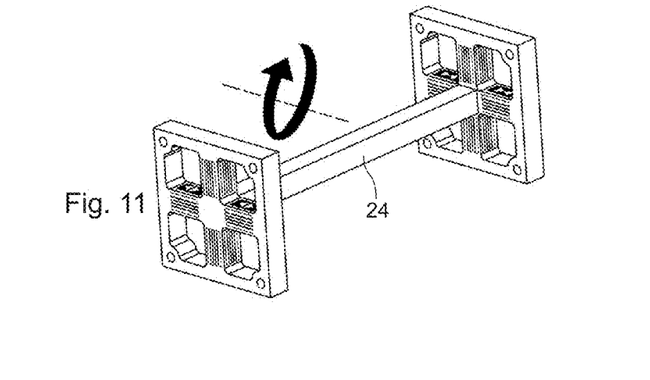
Figures 12, 13:
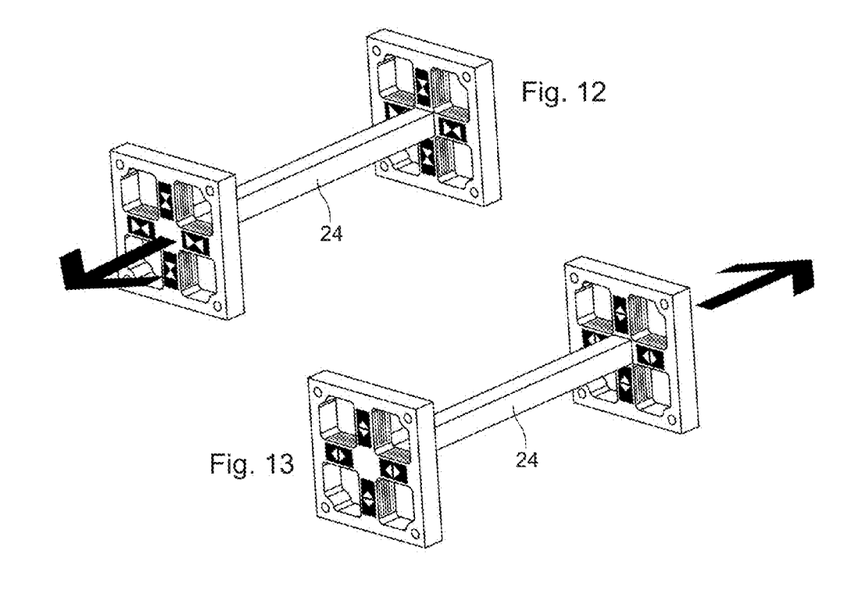
Figures 14, 15:
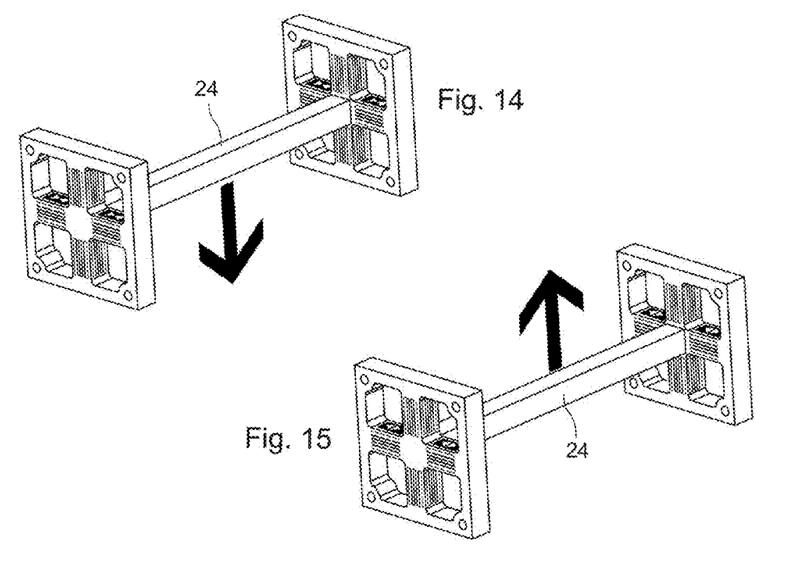
Figures 16, 17:
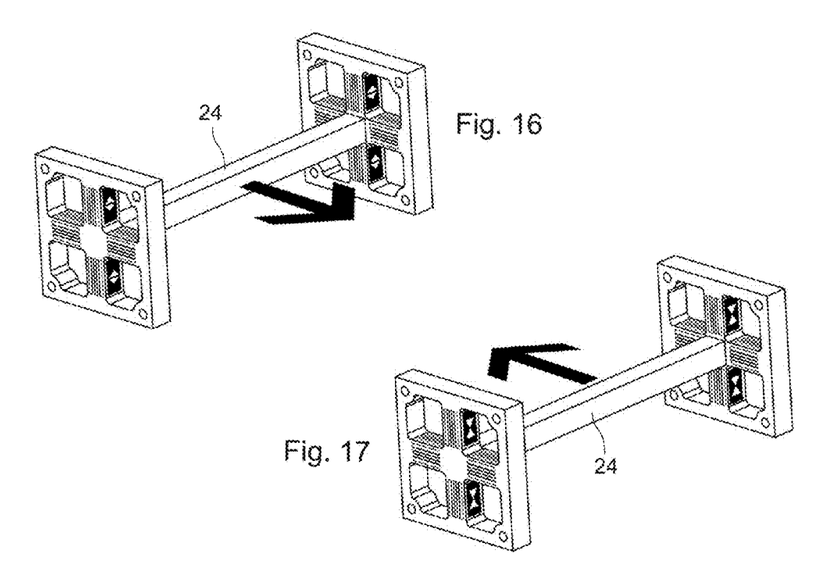

FIG. 5 shows that each measuring beam 26 is provided with at least two, in the depicted embodiment four strain gauges 27 sensing strains in the longitudinal direction of the measuring beam 26 and being generally arranged on two different, non-parallel side surfaces of the measuring beam 26.

FIGS. 6 to 17 illustrate schematic views of the sensing unit, in which strain gauge responses according to applied forces and torques are depicted by labels. Labels showing white arrow-heads pointing apart represent that the strain gauge detects a tension, while white arrow-heads pointing together represent that the strain gauge detects a compression. Strain gauges on the opposite, non-visible side surfaces are also signaling, as it is readily derivable from the Figs. It can be seen that torques around the first direction X (FIGS. 6 and 7), torques around the second direction Y (FIGS. 8 and 9), torques around the third direction Z (FIGS. 10 and 11), as well as forces along the first direction X (FIGS. 12 and 13), forces along the second direction Y (FIGS. 14 and 15), and forces along the third direction Z (FIGS. 16 and 17) applied to the handle bar 24 can be sensed by detecting the signals of the respective strain gauges 27.

Figure 18:
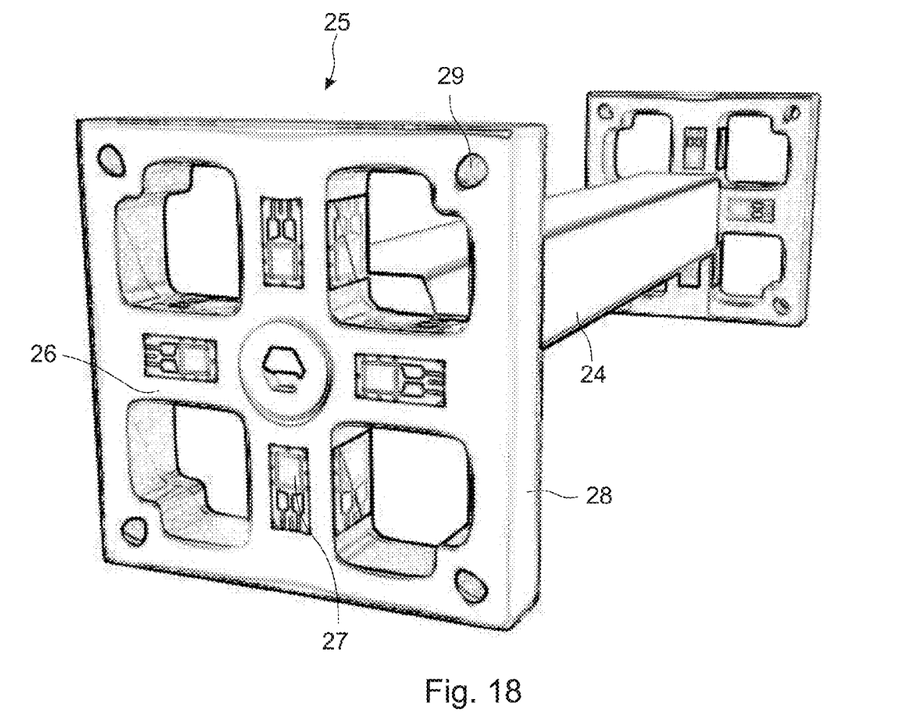
FIG. 18 illustrates a schematic drawing of a particular sensing unit in accordance with the subject matter described herein.

FIG. 18 shows a schematic drawing of a particular embodiment of the sensing unit 2. The first, second and third directions X, Y, Z are orthogonal, i.e. are closing an angle of 90° with each other, and each of the strain gauges 27 is attached to one of the side surfaces of the measuring beam 26, which side surfaces are perpendicular to one of the first, second and third directions X, Y, Z. If the first, second and third directions X, Y, Z are not orthogonal, six degrees of freedom sensing is still possible, however, the sensitivity will not be equal in all directions and the data processing will be somewhat more difficult as the signals of the strain gauges 27 are to be compensated with the given geometry.

Thus, the measuring beams 26 can have a square cross-section and can have four side surfaces, and all of the four side surfaces can be provided with a strain gauge 27. If the side surfaces of the measuring beams 26, on which the strain gauges 27 are arranged, are closing an angle of 90° with each other, a balanced sensitivity and a relatively simple data processing is obtained. However, if the side surfaces close an angle different from 90° with each other, the sensitivity will not be balanced in the directions around the measuring beam 26 and the data processing will be more difficult as the signals of the strain gauges 27 are again to be compensated with the given geometry. The more than two strain gauges 27 on the measuring beam 26 result in redundant strain information, making the sensing more accurate. It is apparent that two strain gauges 27 arranged on two different, non-parallel side surfaces of the measuring beam 26 are a minimum requirement for six degrees of freedom sensing. Strain gauges 27 arranged on parallel side surfaces provide redundant strain information. The side surfaces are not necessarily planar; in a case where the measuring beam 26 is a rod with a circular cross-section, the two different, non-parallel side surfaces mean surface parts around the circumference of the rod with non-parallel tangent lines.

Thus, handle bar 24 is arranged between two groups of strain gauges 27 that measure movements of the wrist. The sensing unit is milled e.g. of 6 mm thick aluminum and no visible deformation can be seen on it when applying forces or torques. There are four measuring beams 26 in each group and four strain gauges 27 are glued onto each measuring beam 26, and strain gauges 27 on opposite sides are paired for measurement. Pairing of the strain gauges 27 helps to increase sensitivity of a Wheatstone bridge in which their resistance change is preferably measured. Altogether 32 strain gauges 27 are used in these two groups, and they output 16 signals. These signals represent highly redundant information, the technical effect of which is that a more effective differentiating is obtained between the different types of forces and moments.

In an embodiment, the transducer 17 is an intelligent transducer, in which strain gauge signals are amplified and fed to an A/D converter that is connected to a microcontroller. The microcontroller is capable of calculating the wrist motion and converting the data to Controller Area Network and/or Ethernet messages. All these components can be arranged in the housing of the transducer 17.

The user or operator can control the motion of a controlled object by moving his/her wrist in the required direction. Motion amplitude will be proportional with the force/torque applied. When controlling the table 15, the operator can make the table 15 follow his/her hands in all directions. This should give the operator the feeling like the table 15 was weightless. All manipulation/motion are initiated, by pushing an enable button, being one of the function buttons 22. The other of the function buttons 22 preferably serves for limiting sensitivity to 50% of the initial sensitivity to be able to make even more subtle interactions. For users who are not used to six degrees of freedom manipulation, the system can be configured to operate alternatively in translation or rotation mode. By pressing a function button, the controller toggles between translation and rotation detection.

The six degrees of freedom transducer can be an intuitive device and can be used for a multipurpose tableside user interface that can control mechanical components e.g. the gantry or the table) or effect 3D manipulation of computer graphics up to six degrees of freedom in medical environments.

Figure 19:
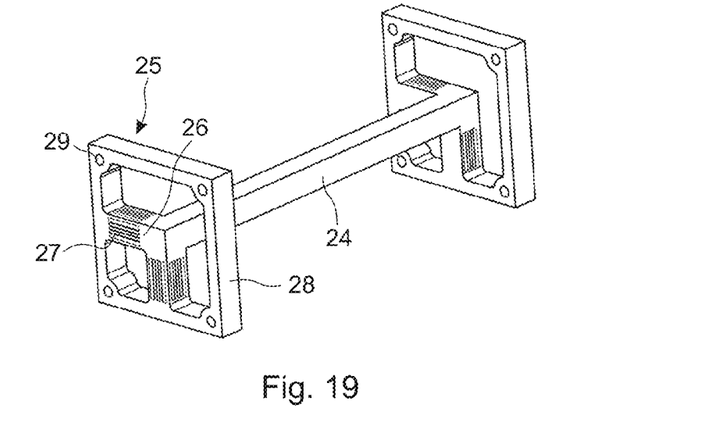
FIG. 19 shows a schematic view of a further embodiment of the sensing unit.

FIG. 19 is a schematic view of another embodiment of the sensing unit. In this embodiment each of the frame structures 25 comprises two measuring beams 26, and each measuring beam 26 is provided with two strain gauges 27. This 'minimum' embodiment is obtained by removing the symmetries from the sensing, i.e. no redundant information is available from the strain gauges 27. This embodiment is still suitable for a six degrees of freedom controller, as at least one strain gauge 27 is always signaling tension or compression in each of the situations depicted in FIGS. 6 to 17.

A technical effect of the transducer is that less space is occupied by the controller as one handle can control multiple devices. The medical workflow is not interrupted at operating the controller, as the user does not have to carry out complicated control movements, but only grabs the handle and all manipulation follows instinctively. The transducer can be waterproof as no moving parts are involved in the design.

A further technical effect of the proposed transducer is that it has a compact design that is easy to clean. A straightforward 3D manipulation or motion can be carried out with one hand by detecting wrist motion through measuring handle strain.

The transducer can also be applied to other fields requiring precise and rapid positioning of an object. If less than six degrees of freedom manipulation is necessary, the transducer can be simply adapted to the given application e.g. by not using or removing unnecessary strain gauges.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-degree of freedom transducer for conveying manually applied forces and torques into electrical signals and configured to be fixed to a base object, the transducer comprising:

a handle bar configured to be gripped by an operator comprising two ends and a first longitudinal direction;

a supporting assembly suitable for fixing the two ends of the handle bar to the base object, the supporting assembly comprising a frame structure at each of the ends of the handle bar, each of the frame structures comprises at least two measuring beams, at least one of the measuring beams having a second longitudinal direction and at least one other of the measuring beams having a third longitudinal direction, wherein the first, second and third longitudinal directions are different from each other, each of the at least two measuring beams comprises two strain gauges configured to sense strain in the third longitudinal direction and arranged on two different, non-parallel side surfaces of each of the at least two measuring beams, wherein the transducer is configured to convert manually applied forces in three degrees of freedom along each of the first, second, and third longitudinal directions and torques in three degrees of freedom into electrical signals corresponding to movements of the operator's wrist and/or hand.

2. The transducer according to claim 1, wherein the first, second and third longitudinal directions are closing an angle of 90° with each other, and wherein each of the strain gauges is attached to a side surface of one of the at least two measuring beams, the side surface being perpendicular to one of the first, second and third longitudinal directions.

3. The transducer according to claim 2, wherein the at least two measuring beams define a square cross-section and comprise four side surfaces with one strain gauge on each of the four side surfaces.

4. The transducer according to claim 3, wherein each of the frame structures comprises four measuring beams, two of which extend in the second longitudinal direction and the other two of which extend in the third longitudinal direction.

5. The transducer according to claim 1, wherein each of the frame structures comprises a frame member around one of the ends of the handle bar, wherein the measuring beams are arranged in a spoke-like manner and interconnect the respective end of the handle bar with the frame member.

6. The transducer according to claim 5, wherein the supporting assembly further comprises a housing configured to be fixed to the base object, the housing comprising function buttons to facilitate (i) selection of an object to be manipulated, (ii) manipulation and/or (iii) adjustment of manipulation sensitivity.

* * * * *

UNITED STATES PATENT AND TRADEMARK OFFICE
CERTIFICATE OF CORRECTION

| | | |
|---|---|---|
| PATENT NO. | : 8,844,376 B2 | Page 1 of 1 |
| APPLICATION NO. | : 13/623062 | |
| DATED | : September 30, 2014 | |
| INVENTOR(S) | : Siklos et al. | |

It is certified that error appears in the above-identified patent and that said Letters Patent is hereby corrected as shown below:

In The Specification

In Column 1, Line 51, delete "Moving, parts" and insert -- Moving parts --, therefor.

In Column 2, Line 13, delete "measuring, beams" and insert -- measuring beams --, therefor.

In Column 3, Line 1, delete "b" and insert -- by --, therefor.

In Column 3, Line 28, delete "fight" and insert -- right --, therefor.

In Column 5, Line 14, delete "initiated, by" and insert -- initiated by --, therefor.

In Column 5, Line 25, delete "e.g. the" and insert -- (e.g. the --, therefor.

In The Claims

In Column 6, Line 8, in Claim 1, delete "convening" and insert -- converting --, therefor.

Signed and Sealed this
Twenty-eighth Day of April, 2015

Michelle K. Lee
*Director of the United States Patent and Trademark Office*